United States Patent Office 3,390,037
Patented June 25, 1968

3,390,037
PROCESS FOR PREPARING PREIMPREGNATED STRANDS OF FIBERS AND USE OF RESULTING PRODUCTS IN MAKING REINFORCED COMPOSITES
Samuel H. Christie, Warren Township, N.J., assignor to Shell Oil Company, New York, N.Y., a corporation of Delaware
No Drawing. Filed Dec. 3, 1963, Ser. No. 327,813
11 Claims. (Cl. 156—148)

This invention relates to a new process for preparing preimpregnated strands of fibers and to the use of the resulting products in making reinforced composites. More particularly, the invention relates to a process for preparing yarns or rovings impregnated with curable resinous materials, and to the use of the resulting products in the filament winding industry, in laminating applications, and in molding applications.

Specifically, the invention provides a new process for preparing strands of fibers, and preferably glass yarn or roving, impregnated with a curable thermosetting material, and preferably a polyepoxide resin, said preimpregnated fibers having unlimited shelf life at ambient temperature but which when exposed to elevated temperatures cure to form products of superior physical properties. This new process comprises applying to one set of strands of fibers or roving a coating of a thermosetting resin which is preferably a polyepoxide resin, and then applying to another set of strands of fibers or roving a curing agent for the thermosetting resin, the two sets of yarn or roving having indefinite pot life at ambient temperatures when stored by themselves.

As a special embodiment, the invention provides a process for preparing preimpregnated glass roving utilizing a polyepoxide as the thermosetting resin which comprises passing a strand of fibers or roving through a liquid bath containing the polyepoxide resin, drying the resulting product, and then passing a second set of yarn or roving through another liquid bath containing only the epoxy resin curing agent, and drying the resulting product, both sets of yarn or roving being capable of being stored indefinitely.

The invention further provides a process for using the above-described new preimpregnated strands for making reinforced composites, such as filament wound products, laminated products, molded products, and the like. This process comprises using the yarn or roving coated with the thermosetting resin and the yarn or roving coated with the curing agent simultaneously in the formation of the reinforced composite, such as, for example, by alternatingly using both sets of yarn or roving in the filament winding of a composite and then applying heat to the resulting product to effect a union of the resin and curing agent and ultimate cure of the thermosetting material.

Many products are now being made by a technique known as filament winding. Products prepared in this manner are generally of very light weight but have excellent strength, good chemical resistance and excellent resistance to deformation. This technique is thus ideally suited for use in making rocket casings, tanks, submarine hulls and the like.

The general procedure for filament winding involves dipping a glass roving or yarn into a liquid mixture containing a resin and curing agent, winding the treated fibers onto a mandrel of the desired shape and then subjecting the resulting product to heat to effect a cure of the resinous binder. In some cases, it is difficult to utilize the roving directly after dipping so attempts have been made to prepare a preimpregnated roving which can be stored for some time before use. The problem here, however, has been to prepare such a product which is stable at room temperature during storage but which can be subsequently cured at a reasonable elevated temperature. Prior attempts at making such room stable products have not been satisfactory as the preimpregnated fibers have required too drastic curing temperatures or have failed to give cured products having the desired physical properties, such as elevated temperature strength and the like.

It is an object of the invention, therefore, to provide a new process for preparing preimpregnated fibers. It is a further object to provide a process for preparing preimpregnated fibers which have unlimited shelf life at ambient temperatures. It is a further object to provide new preimpregnated glass rovings which may be cured at reasonable temperatures and pressures to form the desired product. It is a further object to provide new preimpregnated yarns and rovings which can be cured to form products having excellent strength, good chemical resistance and excellent resistance to deformation and loss of strength at elevated temperatures. It is a further object to provide new preimpregnated glass yarn and rovings which can be used with success in the filament winding, laminating, and molding industries. It is a further object to provide an improved process for preparing reinforced composites using the new preimpregnated rovings. Other objects and advantages of the invention will be apparent from the following detailed description thereof.

It has now been discovered that these and other objects may be accomplished by the process of the invention which comprises applying to one set of strands or roving a coating of a thermosetting resin which is preferably an epoxy resin, and then applying to another set of strands of yarn a coating of the curing agent for the thermosetting resin, the two sets of yarn or roving having indefinite pot life at ambient temperature when stored by themselves. It has also been found that when these two sets of yarn or roving are used simultaneously in the formation of the reinforced composite, such as, for example, by alternatingly using both sets of yarn or roving in the filament winding of a composite, and then applying heat to the resulting product, the resulting reinforced composites have excellent strength, good chemical resistance and excellent resistance to deformation and loss of strength at high temperatures. The new products are thus ideally suited for the preparation of woven cloth which can be subsequently cured or used in the preparation of laminated articles, and in the preparation of filament wound articles as described hereinafter.

The new products are also ideally suited for use in preparing fiber reinforced molded articles, in which the coated strands are cut into ¼″–2″ long segments and subsequently placed in a mold. Heat (e.g., 100–200° C.) and pressures (e.g., 50–1000 p.s.i.) then compress the strands into an infusible, insoluble molded article.

The resinous materials used in the process of the invention include those materials which can be subsequently cross-linked to form an insoluble infusible coating. Examples of these include, among others, unsaturated polyesters, polyurethanes, polycarboxylates, polyolefins, polyepoxides and the like. The preferred materials for use in the process include the polyepoxides, i.e., materials which possess more than one vic-epoxy group, i.e., more than one

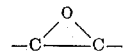

group. These compounds may be saturated or unsaturated, aliphatic, cycloaliphatic, aromatic or heterocyclic and may be substituted with substituents, such as chlorine, hydroxyl groups, alkoxy groups and the like. They may be monomeric or polymeric.

For clarity many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4 - epoxybutyl) maleate, di(2,3 - epoxyoctyl) pimelate, di(2,3 - epoxybutyl) phthalate, di(2,3-epoxyoctyl) tetrahydrophthalate, di(4,5 - epoxydodecyl) maleate, di(2,3-epoxybutyl) terephthalate, di(2,3-epoxypentyl) thiodipropionate, di(5,6-epoxytetradecyl) diphenyldicarboxylate, di(3,4 - epoxyheptyl) sulfonyldibutyrate, tri(2,3-epoxybutyl) 1,2,4-butanetricarboxylate, di(5,6-epoxypentadecyl) tartarate, di(4,5-epoxytetradecyl) maleate, di(2,3-epoxybutyl) azelate, di(3,4-epoxybutyl) citrate, di(5,6-epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl, 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 3,9,12,13-diepoxyeiconsanediodate, dibutyl 7,8,11,12-diepoxyoctadecanedioate, dioctyl 10,11 - diethyl 8,9,12,13-diepoxyeiconsanedioate, dihexyl 6,7,10,11-diepoxyhexadecanedioate, didecyl 9-epoxyethyl-10,11-epoxyoctadecanedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4.5 - diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in above noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5 - tetrakis(hydroxyphenyl)pentane (epoxy value 0.514 eq./100 g.) and the like and mixtures thereof.

The particularly preferred thermosetting resins to be employed include the epoxy-containing condensates of polyepoxides and other reactive materials, such as polycarboxylic acids, polycarboxylic acid anhydrides, polyamines, polymercaptans and the like. In the preparation of these condensates any one or more of the reactive components are combined with at least 1.5 times the equivalent amount of the polyepoxide, preferably in the presence of catalytic materials. The amounts of the reactants are, of course, quite critical. Unless the proper proportions are utilized, the resulting product will be an insoluble infusible product and cannot be utilized in the process of the invention. As used herein, and in the appended claims, the expression "chemical equivalent" amount used in relation to the reactive component and polyepoxide refers to the amount needed to furnish one epoxy group for every reactive group (e.g., anhydride group, carboxyl group, amine hydrogen, etc.). Preferably the reactive component and the polyepoxide are combined in chemical equivalent ratios of 1:2 to 1:4. If the reactive component is trifunctional, a large excess of the polyepoxide is preferred.

The method of combining is also important. It is usually desirable to add the reactive component to the large excess of the polyepoxide to prevent local conversion of the polyepoxide to the insoluble form.

Catalysts that may be used to accelerate the precondensation include, among others, tertiary amines, quaternary ammonium salts and various organo-substituted phosphines, such as triphenyl phosphine, tributyl phosphine and the like. These catalytic materials are preferably utilized in amounts varying from about .05% to 5% by weight of the reactants.

The precondensation may be conducted in the presence or absence of solvents or diluents. If the reactants are fluid materials, the reaction may generally be accomplished without solvents or diluents. However, in some cases, where either one or both reactants are solids or viscous liquids it may be desirable to add diluents to assist in effecting the reaction, such as, for example, inert hydrocarbons as toluene, xylene, cyclohexane, and other materials, such as ethyleneglycol monoethyl ether, cyclohexanone and the like.

Temperatures employed in the reaction will generally vary from about 50° C. to about 150° C. In most cases, the active component and polyepoxide will be quite reactive and temperatures of the order of about 50° C. to 125° C. will be sufficient to effect the desired reaction.

The finished precondensate will vary from viscous liquids to solid resins. They will contain active epoxy groups and can be cured by the reaction with curing agents as described hereinafter. The precondensates are soluble in solvents, such as acetone, toluene, benzene, xylene and the like. The products will be of much higher molecular weight than the basic polyepoxides from which they are formed, and in most cases will contain at least 2 of the polyepoxide units and preferably 3 to 10 units.

Preparation of some of the precondensates according to the above procedure is shown below:

Precondensate of Polyether A and diaminodiphenylsulfone 372 parts of diglycidyl ether of 2,2-bis(4-hydroxyphenyl)propane, (Polyether A—see U.S. 2,633,458), 93 parts of ethyleneglycol monoethyl ether was combined with 62 parts of diaminodiphenylsulfone. The mixture was heated for 3 hours at 110° C., cooled, and reduced to 50% by weight of non-volatiles with acetone.

Precondensate of Polyether A and phthalic anhydride 57 parts of phthalic anhydride was dissolved in 300 parts of Polyether A by heating to 80° C. in a reaction flask equipped with stirrer, condenser and thermometer. The temperature was increased to 100° C. and 3.6 parts of methyl diethanolamine was added causing the temperature to go to 154° C. Stirring was continued for four hours and the temperature slowly dropped to 100° C. The resulting product was a solid resin having an epoxy value of 0.313 eq./100 g., and OH value of 0.09 and acidity of 0.007. This product was easily dissolved in solvent comprising ½ methyl isobutyl ketone and ½ xylene.

Precondensate of glycidyl ether of 1,1,2,2-tetrakis(4-hydroxyphenyl)ethane and diaminodiphenylsulfone 364 parts of the tetraglycidyl ether of 1,1,2,2-tetrakis (4-hydroxyphenyl)ethane was combined with 93 parts of toluene, 93 parts of ethyleneglycol monomethyl ether and 62 parts of diaminodiphenylsulfone. The mixture was stirred and heated to 110° C. and held at this temperature for 3 hours. The mixture was then cooled and reduced to 50% by weight non-volatiles by the addition of acetone.

Other examples of precondensates may be found in Newey—U.S. 2,970,983 and Carey—U.S. 3,067,170.

The curing agent used in the application of a coating to another set of strands of fibers include those materials which convert the aforedescribed thermosetting resinous materials into an insoluble infusible product. The nature of the curing agent will depend on the nature of the thermosetting resin. For example, if the resin is an unsaturated polyester, the curing agent may be one capable of yielding free radicals, such as organic peroxides. If the material is a polyurethane, the curing agent may be a hydrogen-containing material, such as polyols, polyamine and the like.

If the thermosetting material is the preferred polyepoxides noted above, the curing agent may be any of the known materials which cross-link polyepoxides, such as polycarboxylic acids and anhydrides, polymercaptans, boron-trifluoride complexes, hydrazides, polyamides, phenol-formaldehyde resins, urea- and melamine-formaldehyde resins and the like. Particularly preferred are solid curing agents containing a plurality of amino hydrogen atoms, such as, for example, dicyandiamide, malamine, urea, 4,4'-methylene dianiline, meta-phenylenediamine, diaminodiphenylsulfone, and the like. Also preferred as curing agents are imidazoles, such as 2-methylimidazole, imidazole, benzimidazole, and the like.

Also preferred as curing agents are the soluble adducts of amines and polyepoxides and their salts, such as described in U.S. 2,651,589 and U.S. 2,640,037. Still other examples include the acetone soluble reaction products of polyamines and monoepoxides, the acetone soluble reaction products of polyamines with unsaturated nitrile, such as acrylonitrile imidazoline compounds such as obtained by reacting monocarboxylic acids with polyamines, sulfur and/or phosphorus-containing polyamines as obtained by reacting a mercaptan or phosphine containing active hydrogen with an epoxide halide to form a halohydrin, dehydrochlorinating and then reacting the resulting product with a polyamine, soluble reaction products of polyamines with acrylates, and amino hydrogen-containing polyamides as may be obtained by reacting a polycarboxylic acid with a polyamine by conventional methods such as described in U.S. 2,450,940 and U.S. 2,695,908.

Particularly preferred curing agents to be employed include adducts of above-described polyepoxides with at least 1.5 times the equivalent amount of an epoxy curing agent. Epoxy curing agents used in such a reaction are preferably those containing a plurality of neutralizable hydrogen atoms which have a dissociation constant in 0.01 N aqueous solution at 20° C. between $10^{-3}$ and $10^{-12}$. Examples of such include, among others, phosphoric acid, succinic acid, adipic acid, phthalic acid, ethylene diamine, propylene diamine, diethylene triamine, 2,4-diamino-2-methylpentane, 3,4-diamino-3,4-dimethylhexane and the like.

As with the epoxy-containing precondensates, it is important also in making the curing agent adduct to use proper amounts of curing agent and polyepoxides in order to obtain the desired soluble adduct curing agent. One must use at least 1.1 times the equivalent amount of the polyepoxide. As used herein, and in the appended claims, the expression "chemical equivalent" amount as used in relation to the curing agent and polyepoxide refers to the amount of curing agent needed to furnish one neutralizable hydrogen per epoxy group. Preferably the curing agent and polyepoxide are combined in equivalent ratios of 1.5:1 to 4:1.

The method of combining is also important. It is usually desirable to add the polyepoxides to the large excess of the reactive component to prevent local conversion of the polyepoxide to the insoluble form.

The reaction may be conducted in the presence or absence of solvents or diluents. In case diluents are desired, they may be the inert hydrocarbons, such as toluene, xylene, cyclohexane, and other materials, such as ethyleneglycol monoethyl ether, cyclohexanone and the like.

Temperatures employed in the reaction will generally vary from about 5° C. to about 150° C. In most cases, the active component and polyepoxide will be quite reactive and temperatures of the order of about 50° C. to 125° C. will be sufficient to effect the desired reaction.

The finished curing agent adduct will vary from viscous liquids to solids. They will contain active hydrogen atoms and will act to cure polyepoxides when combined therewith. The curing agents are soluble in solvents, such as acetone, toluene, benzene, xylene and the like. The products will be of much higher molecular weight than the basic curing agent from which they are formed, and in most cases will contain at least 2 of the curing agent molecules and preferably from 3 to 10.

The preparation of some of the curing agent adducts according to the above procedure is shown below:

Polyether A and m-phenylenediamine adduct 205 parts of m-phenylenediamine, 50 parts ethyleneglycol monomethyl ether and 187 parts of toluene were mixed together and heated to 65° C. 357 parts of Polyether A were then added. The temperature was then raised to 100° C. and held there for about 2 hours. The curing agent solution was cooled and reduced to 50% nonvolatile with acetone.

Polyether A and diethylenetriamine adduct 0.43 mole of diethylenetriamine was dissolved in 50 parts of dioxane. The solution was heated to 60° C. and 100 parts of Polyether A dissolved in 100 parts of dioxane were added thereto. The reaction mixture was heated to about 104° C. for 20 hours and the resulting solution run into water to precipitate the same. The resulting product was a polyamine adduct which could be easily dissolved in acetone to form an active curing agent solution.

Other examples of adduct curing agents may be found in Shokal et al.—U.S. 2,651,589 and Shokal et al.—U.S. 2,643,239.

The coatings of the two sets of strands of fibers may be accomplished in any suitable manner. The preferred method comprises forming solution of the desired materials and then dipping or otherwise applying the desired solution to the strands. In most cases, it is preferred to place the impregnating solution in conventional impregnation equipment and run the strands or roving into and through the bath containing the impregnating solution.

It is also possible, of course, to apply the materials as by painting, spraying or other suitable methods.

The amount of the coating may vary depending on the reactants and intended applications. In general, the amount of thermosetting polymer applied varies from 15% to 50% of the total weight of strand or fiber.

The amount of curing agent applied will vary depending on the type selected. For example, if one employed a catalytic material or the peroxide catalysts, only small amounts e.g., 1% to 25% may be needed. With the curing-agent type materials as the above-noted epoxy curing agents, where there is a dual reaction, large amounts may be utilized. In this latter case, in general the amount applied will vary from 10% to 100% of the total weight of the fiber or strand.

After the coating has been applied, it is preferred to dry the treated strand. This may be accomplished by passing the impregnated strand through drying oven or other means to expose the strands to the necessary heat. Preferred drying temperatures vary from about 70° C. to about 100° C.

The finished coated strand or roving may then be rolled on a spool and stored for eventual use in the formation of reinforced composites. The finished coated strands will be stable at temperatures up to about 100° C. and can be stored indefinitely at temperatures below that point.

As noted, the new preimpregnated strands or rovings can be utilized for a great variety of different applications. They may be used, for example, in conventional filament winding operations to form rocket casing, tanks, submarine hulls, tanks for cars and trucks and the like. The preimpregnated strands or rovings may also be woven into cloth. The cloth is first woven by simultaneous use of the different sets of strands coated with the thermosetting polymer and curing agent. The cloth is then cut into squares, stacked and made into a laminate using heat and pressure. The preimpregnated strands may also be simultaneously cut, then placed in suitable molds, and made into molded articles using heat and pressure.

The preimpregnated strands of the present invention are particularly suited for use in the preparation of filament wound composites. In this application, the preimpregnated strands or roving are simultaneously wound under tension e.g., 0.1 to 2.5 lbs., onto the desired mandrel or form and heat applied to effect a union of the thermosetting resin and curing agent and ultimate cure of the resin.

Care should be taken to insure that the proportion of resin and curing agent brought together on the mandrel is such to provide optimum properties to the cured composite. Such proportions may be varied by adjusting the resin and/or curing agent content of the separate strands or by varying the number of strands coated with, for example, the resin to be used simultaneously with, for example, a single strand coated with curing agent.

The winding may be accomplished in any desired manner, such as around the circumference of the mandrel or at any desired angle.

Temperatures used in the melting and curing of the resin preferably are above 125° C. and more preferably between 125° C. and 175° C. The time for cure will vary with the various components and temperatures, but will generally vary from a few minutes to 3 or more hours.

The composites formed by the above process will be hard insoluble infusible products with excellent strength, good chemical resistance and excellent resistance to deformation. Depending on the equipment and method of winding employed, the products can be utilized as pipes, tubes, poles, rocket casings, tanks, submarine hulls, silos and the like.

In making laminates from the preimpregnated strands as by first weaving cloth therefrom as noted above, one generally superimposes the sheets of cloth according to the desired number of plies and then applies heat and pressure to melt and combine the reactants, and to form the desired laminated products. Temperatures in this application will generally range from about 125° C. to 200° C., with pressures generally varying between 25 and 500 p.s.i.

The strands of fibers used in the process of the invention include those of continuous or stable type such as rovings, yarns, strings, threads, and the like. The strands may be made out of a variety of different materials. They may be natural or synthetic and may be of any desired size. Examples of these materials include, among others, cotton, linen, silk, cellulose esters, jute, hemp, rayon, animal fibers, such as wool, hair, mohair, synthetic fibers including fibers from polyesters, such as, for example, the ethylene glycol-terephthalic acid esters (Dacron), the acrylic polymers, such as, for example, acrylonitrile polymers (Orlon), the polyethylenes, polypropylenes, polyurethanes (Perluran), polyvinyl alcohol, proteins, vinyl chloride vinylidene polymers (Vinyon), mineral fibers (fiberglass), polyamides, such as the aliphatic dicarboxylic acid-polyamides reaction products (nylon), and the like and mixtures thereof. Because of its greater strength, strands prepared from glass are particularly preferred. The process is also applicable, of course, to the treatment of individual fibers, yarns and to the treatment of tapes, woven or nonwoven. The process is also applicable to fine wires, such as stainless steel, copper and phosphated steel wires. Wires that are used normally range in diameter from 0.004 to 0.05 inch in diameter.

To illustrate the manner in which the invention may be carried out, the following examples are given. It is to be understood, however, that the examples are for the purpose of illustration and that the invention is not to be regarded as limited to any of the specific conditions or reactants recited therein. Unless otherwise specified parts described in the examples are parts by weight. The polyethers referred to by letter are those in U.S. 2,633,458.

EXAMPLE I

This example illustrates the preparation of a storage stable preimpregnated fiber from a precondensate of Polyether A and a curing agent comprising an adduct of Polyether A and an excess of m-phenylenediamine.

Preimpregnated roving was made by passing 12-end S-glass roving, with HTS finish, through a 30% by weight solution of a precondensate prepared by reacting Polyether A with diaminodiphenylsulfone (precondensate prepared as above). The solvent was removed by next passing the roving through an 8 foot long heated oven at 1.5 ft./sec. with the oven heated to 275° F. The dry roving, containing 23% by weight of the precondensate, was wound on spool and stored at room temperature. The product was stable for many months under these conditions.

Another preimpregnated roving was made by passing 12-end S-glass roving, with HTS finish, through a 30% by weight solution of an adduct made by reacting Polyether A with an excess of m-phenylenediamine (adduct prepared as noted above). The solvent was removed by passing the roving through an 8 ft. heated oven at 1.0 ft./sec. with the oven heated to 280° F. The dry roving, containing 23% by weight of this adduct, was wound on a spool and stored at room temperature for many months.

A filament wound composite was made by simultaneously helically winding three preimpregnated rovings containing the epoxy-containing condensate and one roving containing the polyamino-containing adduct. Twelve pounds of tension was applied to the combined roving, and the mold heated with a heat gun to melt the roving. When the winding operation was complete, the composite was placed in an oven and cured 2 hours at 80° C. and 2 hours at 140° C. The resulting composite was hard and had good solvent resistance and good resistance to loss of strength and deformation at elevated temperatures.

EXAMPLE II

Example I was repeated with the exception that the one roving was preimpregnated with an epoxy-containing precondensate of tetraglycidyl ester of 1,1,2,2-tetrakis(4-hydroxyphenyl)ethane prepared as noted above, and the other set was impregnated with the amino-containing adduct of Polyether A and diethylenetriamine and diaminodiphenylsulfone. In this case, the resulting rovings were still room stable and could be stored for many months without danger of gelation. The resulting reinforced composite was hard and solvent resistant and had good resistance to deformation and loss of strength at elevated temperatures.

EXAMPLE III

Example I was repeated with the exception that the curing agent employed on the roving was an adduct of methylenedianiline and polyether A. Related results are obtained.

EXAMPLE IV

Example I was repeated with the exception that the curing agent employed on the roving was an adduct of diethylenetriamine and Polyether A. Related results are obtained.

EXAMPLE V

A piece of fabric was prepared by simultaneously weaving the two sets of preimpregnated strands in Example I. Squares were cut from this sheet, superimposed and the composite cured at 125° C. and 500 p.s.i. The resulting product is a hard, tough laminate.

EXAMPLE VI

A molded disc was prepared by simultaneously cutting the two sets of preimpregnated strands in Example I. The cut strands, approximately ¼" long, were placed in a compression mold preheated to 150° C. After 5 minutes in a press at 500 p.s.i. a hard, infusible and insoluble disc was removed from the mold.

EXAMPLE VII

Example I is repeated with the exception that the curing agent is as follows: 2-methylimidazole, melamine, 4,4'-methylenedianiline and benzimidazole. Related results are obtained.

EXAMPLE VIII

Example I is repeated with the exception that the precondensate of Polyether A is replaced with a precondensate of Polyether A and phthalic anhydride prepared as noted above. Related results are also obtained.

I claim as my invention:

1. A process for preparing reinforced composites which comprises applying to one set of strands of fibers a coating which contains a thermosetting resin and then applying to another set of strands of fibers a coating which contains a curing agent for the thermosetting resin, drying the strands and then simultaneously winding the separately treated strands onto a mandrel to form a reinforced composite product, and heating the composite product to cure the thermosetting resin.

2. A process as in claim 1 wherein the thermosetting resin is an epoxy resin.

3. A process for preparing reinforced composites which comprises applying to one set of strands a coating consisting of a polyepoxide resin, and then applying to another set of strands a coating which contains a curing agent for the polyepoxide resin, drying the strands and then simultaneously winding the separately treated strands onto a mandrel under tension to form a reinforced composite product, and heating the composite at a temperature between 100° C. and 200° C. to cure the polyepoxide resin.

4. A process as in claim 3 wherein the fibers are glass roving.

5. A process as in claim 3 wherein the polyepoxide is an epoxy-containing precondensate of a polyglycidyl ether and a polyamine.

6. A process as in claim 5 wherein the epoxy resin curing agent is an imidazole.

7. A process as in claim 3 wherein the epoxy resin curing agent is a polyamino-containing adduct of a polyglycidyl ether and an excess of a polyamine.

8. A process as in claim 3 wherein the polyepoxide is an epoxy-containing precondensate of a glycidyl polyether of 2,2-bis(4-hydroxyphenyl)propane and an aromatic polyamine, and the polyepoxide curing agent is an amino-containing precondensate of a glycidyl polyether of 2,2-bis(4-hydroxyphenyl)propane and an aromatic polyamine.

9. A process for preparing a reinforced composite which comprises impregnating one set of strands of fibers with a coating containing a polyepoxide thermosetting resin, impregnating a second set of strands of fibers with a liquid curing agent for the polyepoxide resin, drying the strands and then weaving the two sets of strands into a reinforced composite product, and then applying heat to effect a union of the resin and curing agent and ultimate cure of the thermosetting material.

10. A process as in claim 9 wherein the composite was heated to a temperature between 100° C. and 200° C.

11. A process for preparing reinforced composites which comprises impregnating one set of strands of glass roving with a coating containing a polyepoxide thermosetting resin, impregnating a second set of strands of glass roving with an epoxy curing agent containing a plurality of amino hydrogen atoms, drying the strands and simultaneously utilizing the strands in filament winding on a mandrel, and then applying heat to the resulting product to effect a union of the resin and curing agent and ultimate cure of the epoxy resin.

References Cited

UNITED STATES PATENTS

| | | | |
|---|---|---|---|
| 2,427,519 | 9/1947 | Blyler | 156—310 X |
| 2,639,258 | 5/1953 | Evans et al. | 156—310 |
| 2,651,589 | 9/1953 | Shokal et al. | 156—310 |
| 2,746,898 | 5/1956 | Buckwalter et al. | 156—310 X |
| 2,951,003 | 8/1960 | Stephens | 156—173 |

EARL M. BERGERT, *Primary Examiner.*

HAROLD ANSHER, *Examiner.*